(12) United States Patent  
Gupta

(10) Patent No.: US 11,392,932 B1  
(45) Date of Patent: Jul. 19, 2022

(54) LENS DEPICTION PROFILE TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/325,342

(22) Filed: May 20, 2021

(51) Int. Cl.
*G06Q 20/34* (2012.01)
*G06Q 20/40* (2012.01)
*G06Q 20/38* (2012.01)
*G06Q 20/32* (2012.01)

(52) U.S. Cl.
CPC ......... *G06Q 20/352* (2013.01); *G06Q 20/325* (2013.01); *G06Q 20/389* (2013.01); *G06Q 20/4016* (2013.01)

(58) Field of Classification Search
CPC .. G06Q 20/352; G06Q 20/325; G06Q 20/389; G06Q 20/4016
See application file for complete search history.

(56) References Cited

U.S. PATENT DOCUMENTS

| 8,538,806 | B2* | 9/2013 | Kuznetsov | G06Q 40/02 705/14.1 |
| 9,665,818 | B1* | 5/2017 | Cardinal | G06K 19/0702 |
| 10,872,345 | B1* | 12/2020 | Walters | G06Q 20/202 |
| 2021/0383338 | A1* | 12/2021 | Gupta | G06V 10/17 |
| 2022/0067687 | A1* | 3/2022 | Hay | G06Q 20/3829 |
| 2022/0067698 | A1* | 3/2022 | Griffin | G06Q 20/3276 |

\* cited by examiner

*Primary Examiner* — Sonji N Johnson
(74) *Attorney, Agent, or Firm* — Weiss & Arons LLP

(57) ABSTRACT

A smart card with secure and efficient image capture and analysis is provided. The card may include a non-transitory memory embedded in the housing storing computer-executable instructions. The instructions, when run on the microprocessor, are configured to capture, via the camera, an image of a building (or other suitable image), process the image via an image processing module, determine, based at least in part on the processing of the image, a payment amount and a payment recipient associated with the building. The smart card may also display payment information on the display screen. The payment information may include the payment amount and/or the payment recipient. When authorization is received via a tactile sensor, the card may execute a payment or other communication, over a payment gateway from an account associated with a user of the platform to an account associated with the payment recipient.

18 Claims, 8 Drawing Sheets

LENS DEPICTION PROFILE TECHNOLOGY

FIELD OF TECHNOLOGY

Aspects of the disclosure relate to computer systems. Specifically, aspects of the disclosure relate to systems and methods for increasing security and efficiency in digital networks.

BACKGROUND OF THE DISCLOSURE

It is common for consumers to have at least one payment instrument, such as a credit or debit card, easily accessible. Consumers typically execute transactions, including financial institution (FI) communications, donations, bill payments, or other payments, using those payment instruments.

However, conventional payment instruments are usually unable to execute the transactions absent the assistance of other devices. Exemplary devices include laptops, desktops, and mobile phones. Requiring the use of other devices is inconvenient and inefficient. Using other devices may also expose the transaction to security risks.

Furthermore, consumers executing transactions typically engage in a multi-step process that includes extracting payee information from one or more sources, and subsequently executing the payment via the instrument.

It would be desirable, therefore, to provide systems and methods for smart payment instruments with self-contained transaction architecture, thereby increasing the efficiency and security of transactions executed via the smart payment instruments.

It would be further desirable for the smart payments instruments to streamline the transaction information extraction and execution process.

It would be even more desirable to provide systems and methods for leveraging a payment instrument to conduct transactions with an entity primarily associated with a location, where the transactions are based on a pictorial rendition of a location.

SUMMARY OF THE DISCLOSURE

A platform for secure and efficient communication, and communication and/or transaction execution with a physical plant, is provided. The platform includes a smart card. The smart card includes a microprocessor, a camera, a power source for the microprocessor and the camera, a wireless communication element configured to provide wireless communication between the smart card and a communications gateway.

A non-transitory memory includes computer-executable instructions that, when run on the microprocessor, are configured to capture, via the camera, an image of the physical plant. The image includes image information indicative of the identity of the physical plant. The microprocessor may be further configured to process the image via an image information processing module, determine, based at least in part on the processing of the image information, a texting information recipient associated with the image; and execute a communication, over the communication gateway. The communication may be related to an account associated with a user of the platform and to an account associated with the entity information recipient.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
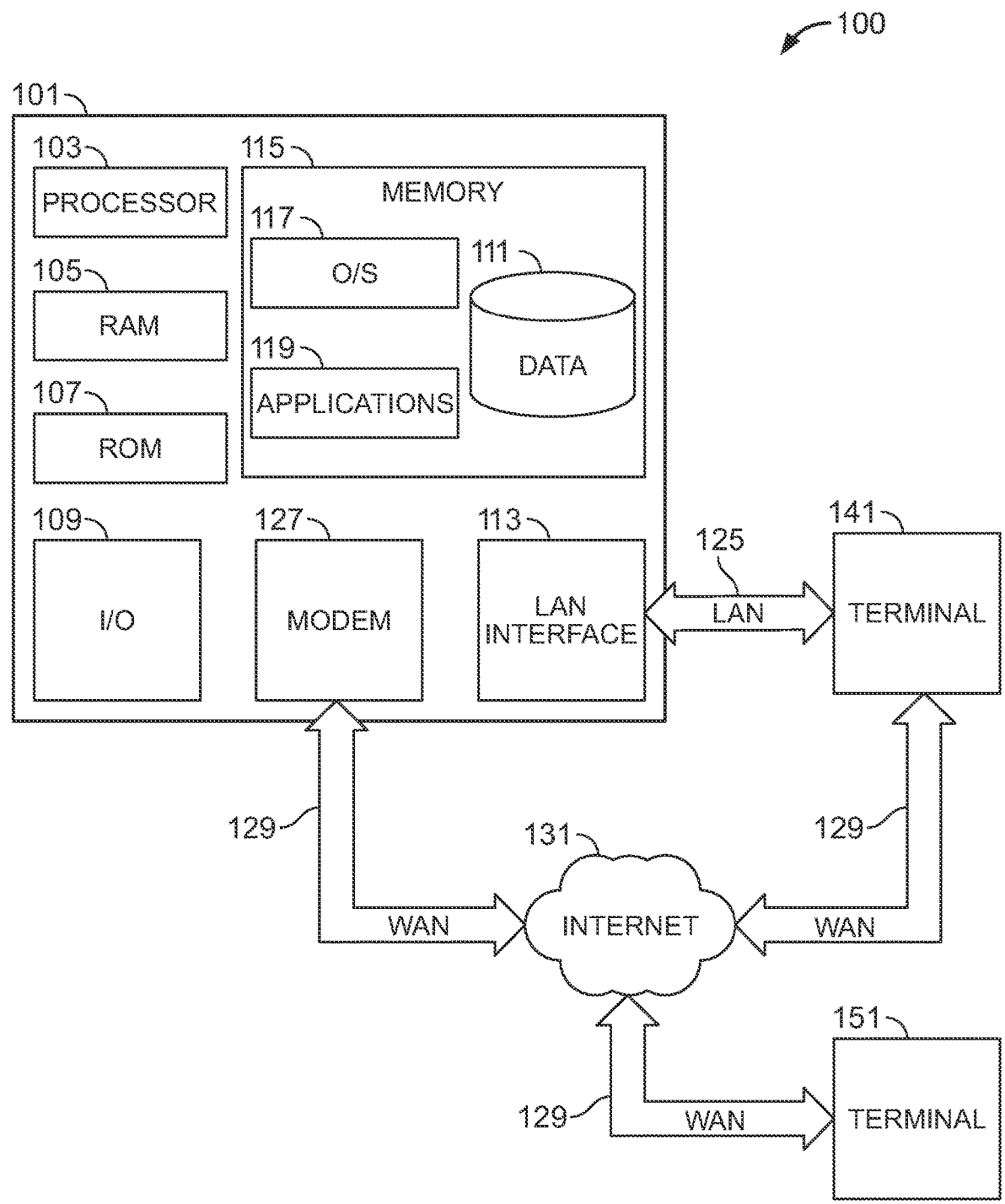
FIG. 1 shows an illustrative block diagram of a system for in accordance with principles of the disclosure.

There is currently no technology in place which can enable a user to hover his/her card on any building, organization or location and communicate with, and/or make a transaction with, an entity associated with the location.

A technology which enables a user to hover a payment instrument such a debit or credit card on any building/organization/location and execute a transaction with an entity associated therewith, without having to know, preferably prior to the transaction, the account information of that entity, or other identifying information about the entity, and without having to know anything about that entity at all, would be significant technology. Specifically, such a technology saves time and resources required to glean such information from a source separate and apart from the building/organization/location.

For example, if a user physically stands in front of an orphanage or displays a picture of an orphanage on his laptop screen, no easy option exists by which the user could transact with the orphanage—absent an additional communications medium.

It would be desirable to provide systems and methods for leveraging a payment instrument to conduct transactions based on a pictorial rendition of a location.

Systems and methods for secure and efficient physical plant capture, analysis, and communication execution are provided. A system may be a platform that includes a smart card.

In certain embodiments, the smart card may include a housing made from metal and/or plastic. The card may at least partially resemble a typical debit or credit card.

The housing may have dimensions that conform to the ISO/IEC 7810 ID-1 standard. The dimensions may, in some embodiments, be no greater than 86 millimeters×54 millimeters×0.8 millimeters.

The smart card may include a microprocessor, a camera, and a power source for the microprocessor and the camera. The smart card may include a wireless communication element configured to provide wireless communication between the smart card and a central system and/or payment gateway. The smart card may include a non-transitory memory storing computer-executable instructions that, when run on the microprocessor, are configured to perform some or all the disclosed features of the platform.

In certain embodiments, the wireless communication element may be a nano-wireless network interface card ("NIC"). In some embodiments, the power source may be rechargeable. The power source may recharge via solar energy. The power source may recharge via inductive charging, e.g., with a wireless recharging mechanism. The power source may recharge via a charging port. A charging port may include mini or micro Universal Serial Bus (USB) connectors, or any other suitable connector. The power source may recharge via any other suitable charging mechanism.

The microprocessor, the camera, the power source, the wireless communication element, and/or the memory may be embedded in the smart card. In some preferred embodiments, the camera may be installed so that the lens is directed out of the rear of the card.

The smart card may be configured to capture, via the camera, an image of a physical plant—such as a building. The smart card may be configured to process the image via an image processing module. The smart card may be configured to identify, based at least in part on the processing of the image, a payment (or other communication) recipient associated with the physical plant. The smart card may also be configured to execute a payment, over the payment gateway from an account associated with a user of the smart card to an account associated with the physical plant—or with an entity associated therewith.

In some embodiments, when the physical plant, or an entity associated therewith, is not internally detectable from the image (i.e., the entity name, and/or other identifying information, is not recorded explicitly in the image), determining the identity of the physical plant or the entity associated there with may include leveraging information derived from the processing of the image. Leveraging information may include searching the internet or other relevant store of information, preferably via an artificial intelligence (AI) component of the platform, for physical plant or -entity identity associated with the information. The information may, in certain scenarios, include a company logo.

In some embodiments, the platform may be further configured to resolve, preferably via an artificial intelligence (AI) component of the platform, a payment routing path for the entity or physical plant as a payment recipient. Resolving the payment path may include searching a database associated with a financial institution associated with the recipient.

In some embodiments, the platform may further include a display screen and also, preferably, a tactile sensor. The platform may be further configured to display an image of the physical plant and/or associated information on the display screen and/or payment information.

Payment information may include the balance amount and/or the payment recipient. The platform may be configured to execute the payment when authorization is received via the tactile sensor. The authorization may, for example, include entry of a personal identification number (PIN). In certain embodiments, the display screen and the tactile sensor may be combined in a touchscreen that may be embedded in the smart card.

A method for secure and efficient image capture, analysis, and execution is provided. The method may include capturing, via a camera embedded in a smart card, an image of a building where the building includes text fields. The processing, via a microprocessor embedded in the smart card and using a text processing module, may include using the text fields to identify the image. The process may include determining, based at least in part on the processing of the text fields, a payment, or other communication, recipient associated with the building.

The method may also include executing a payment for an amount from an account associated with a user of the smart card to an account associated with the payment recipient. The executing may be performed via a wireless communication element embedded in the smart card which may be configured to provide wireless communication between the smart card and a payment gateway.

In some embodiments of the method, when the payment recipient is not internally detectable from the text fields, the determining the payment recipient may include leveraging information derived from the processing of the text fields. Leveraging information may include searching the internet, via an artificial intelligence (AI) component of the platform, for a payment recipient associated with the information. The information may include a company logo. The company logo may act as an image that can be leveraged.

In some embodiments, the method may further include resolving, via an artificial intelligence (AI) component of the platform, a payment routing path for the payment recipient.

In certain embodiments, the method may also include displaying payment information on a display screen embedded in the smart card. Payment information may include an outstanding balance amount and/or the payment recipient.

The method may also include executing the payment when authorization is received via a tactile sensor embedded in the smart card. Authorization may, in some embodiments, include entry of a personal identification number (PIN).

Security and efficiency associated with transactions such as bill payments are thus improved. Security may be increased by providing a platform with dedicated transactional hardware, software, and/or communication channels. Such a platform may be associated with a decreased risk of infection with malware, spyware, or other security risk factors.

Efficiency may be increased by enabling a user to perform the transaction without having to parse, decipher, and act upon information in a bill. Efficiency may also be increased by eliminating the need to use a device external to a dedicated payment instrument to perform the transaction.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to cash verification and remote deposit. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to monitoring electronic teleconferences.

Computer 101 and/or terminals 141 and 151 may also be devices including various other components, such as a battery, speaker, and/or antennas (not shown).

Terminal 151 and/or terminal 111 may be portable devices such as a laptop, cell phone, Blackberry™, tablet, smartphone, or any other suitable device for receiving, storing, transmitting and/or displaying relevant information. Terminals 151 and/or terminal 111 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. It should be noted that such module may be considered, for the purposes of this application, as engines with respect to the performance of the particular tasks to which the modules are assigned.

Figure 2:
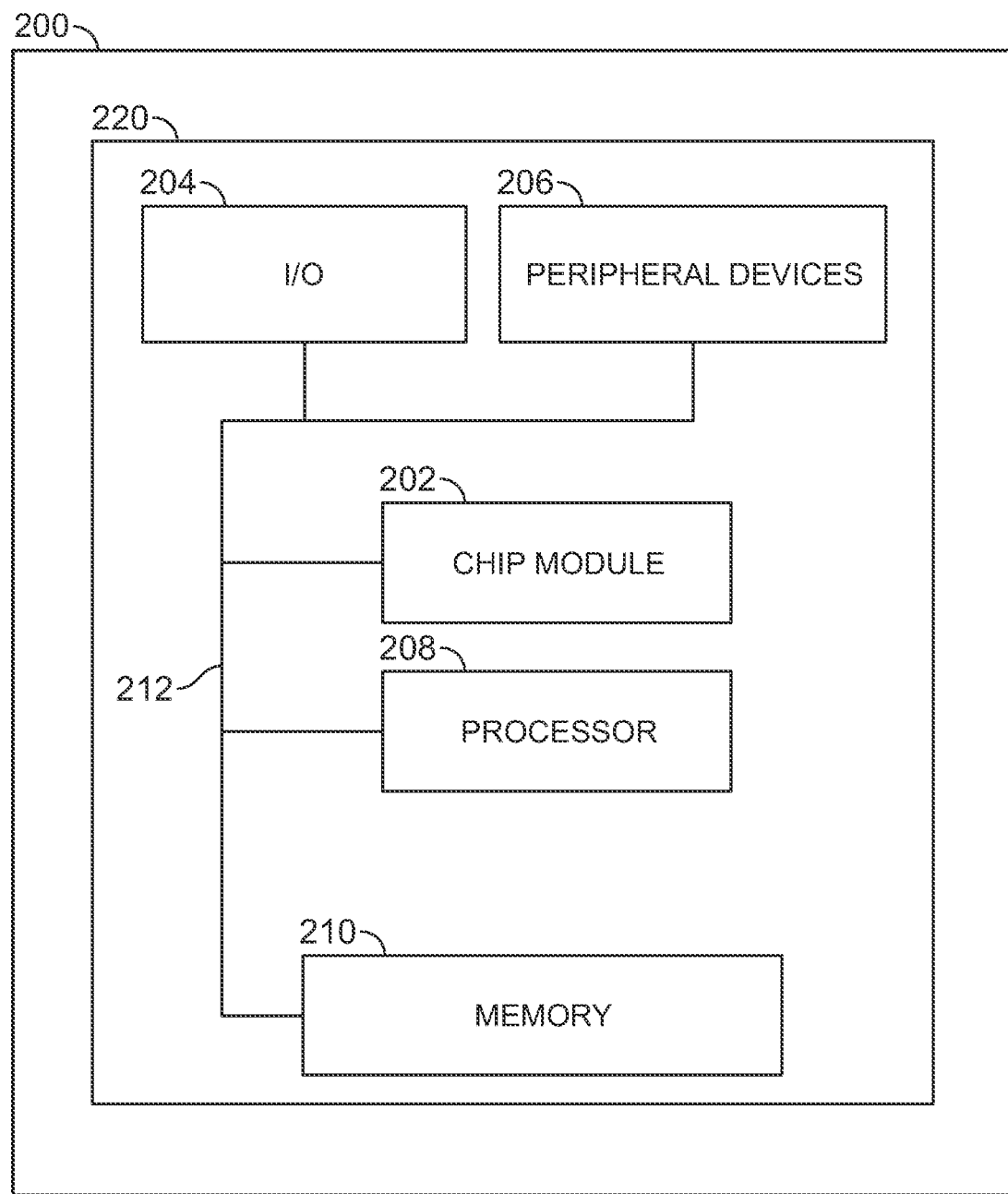
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
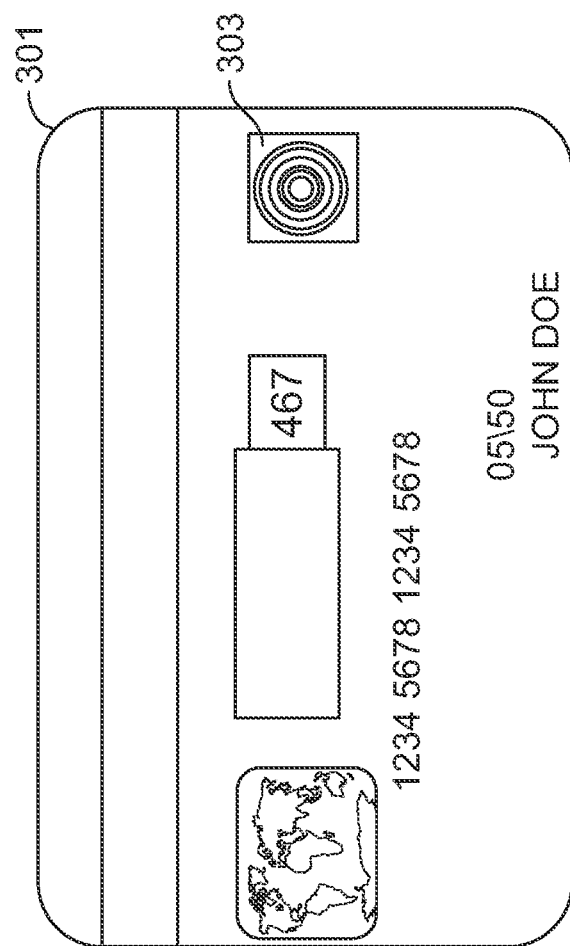
FIG. 3 shows an illustrative schematic diagram of a system according to the disclosure.

FIG. 3 shows illustrative smart card 301 configured in accordance with principles of the disclosure. Smart card 301 shows camera 303 embedded in the smart card or in something identified as a smart card housing. Camera 303 is preferably an inbuilt camera 303 located on the back side of card 301. It should be noted that camera 303 could be located on or in other locations on the card.

In some embodiments, camera 303 may be embedded in the rear of smart card 301. Camera 303 may be used for capturing images of buildings, or other relevant physical plants, objects or locations.

Figure 4:
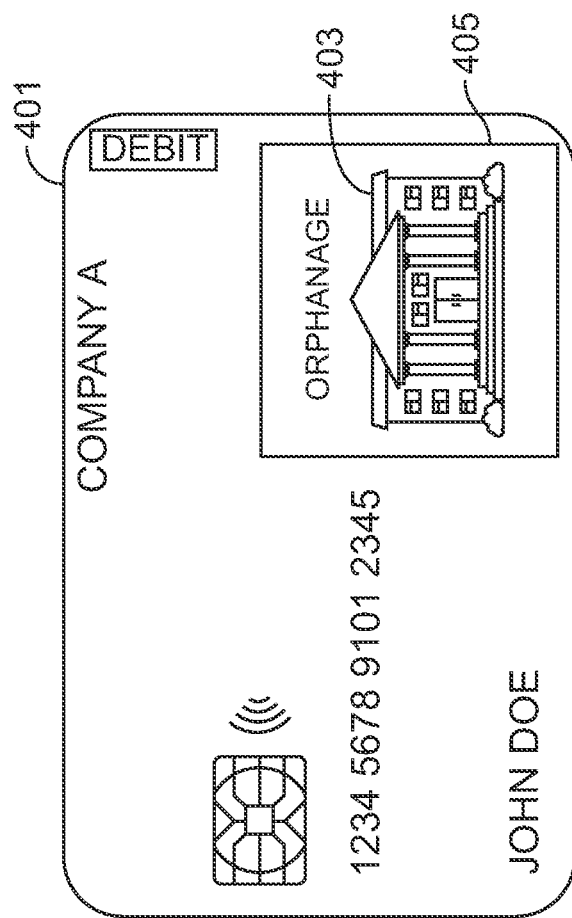
FIG. 4 shows another illustrative schematic diagram of a system according to the disclosure.

FIG. 4 shows illustrative smart card 401 configured in accordance with principles of the disclosure. Smart card 401 may be shown capturing an image of illustrative building 403—e.g., an orphanage. The image may be captured by a camera embedded in card 401 (not shown in FIG. 4). In certain embodiments, the image may be captured as a user hovers the card over a soft copy of an orphanage image or the user directs the camera at the orphanage itself. The image may be shown in FIG. 4 displayed on a display screen 405 of card 401.

Figure 5:
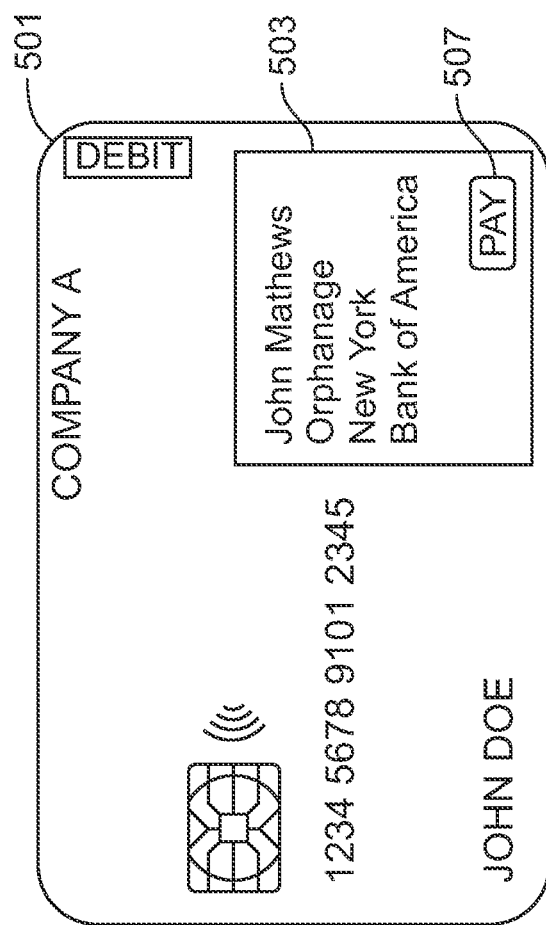
FIG. 5 shows an illustrative flow diagram according to the principles of the disclosure.

FIG. 5 shows illustrative smart card 501 configured in accordance with principles of the disclosure. The smart card 501 may be shown with a display 503 and a tactile sensor 507 (e.g., a keypad). The keypad and tactile sensor may be combined in touchscreen 503, as shown.

Smart card 501 with touchscreen 503 may be configured to include an authorization process for a transaction. The authorization may include entry of a PIN via the tactile sensor in response to a payment amount and/or a service provider displayed on the display.

Figure 6:
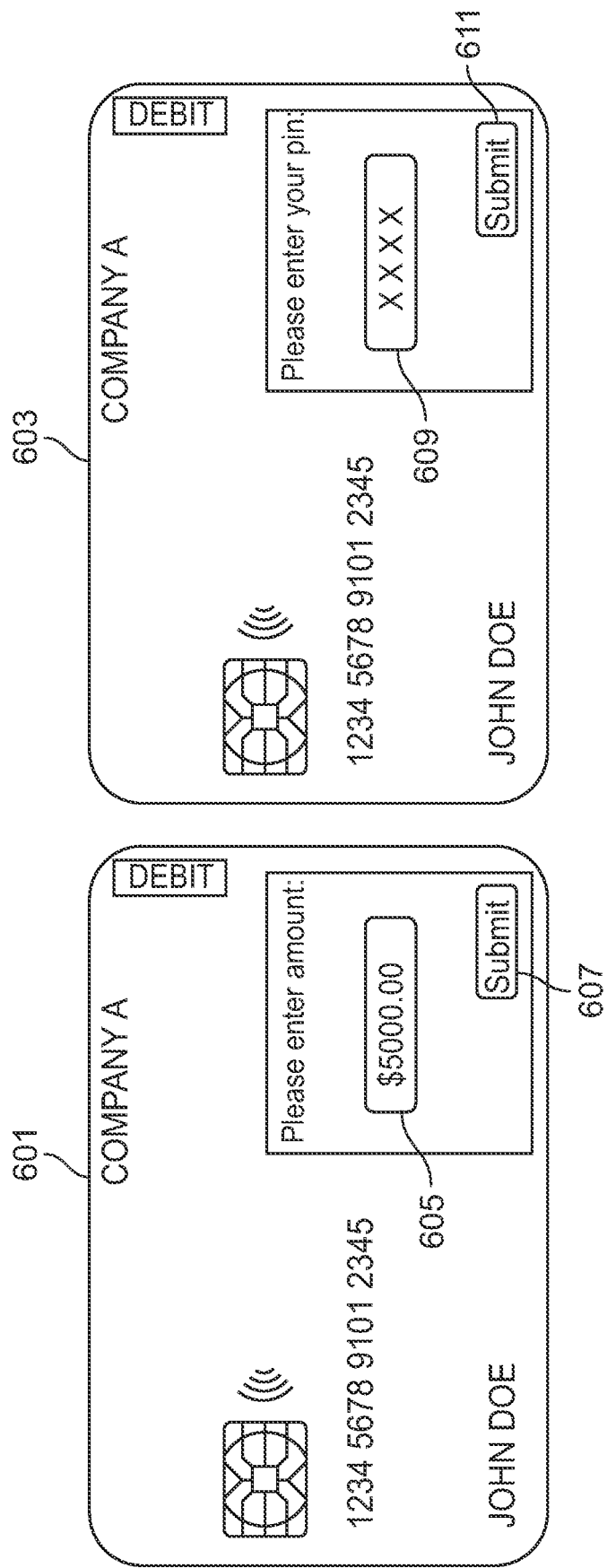
FIG. 6 shows smart cards according to the principles of the disclosure.

FIG. 6 shows smart card 601. FIG. 6 also shows an amount 605 entered by a user. Entry of the amount causes the amount to be submitted by pressing the "submit" tactile button 607.

FIG. 6 also shows a second card 603. Card 603 includes a PIN XXXX 609 entered by a user. Transmission of the PIN 609 may be triggered by pressing the "submit" tactile button 611. Transmission of PIN 609 may cause the amount to be submitted. PIN 609 may be required, in certain embodiments, to enable the submission of the requested payment amount shown at 605—i.e., the payment amount 605 and PIN 609 may work in tandem to enable a submission. In certain embodiments, payment amount 605 and PIN 609 may appear on the same screen and may both be submitted together with a single actuation of a tactile button 611.

Figure 7:
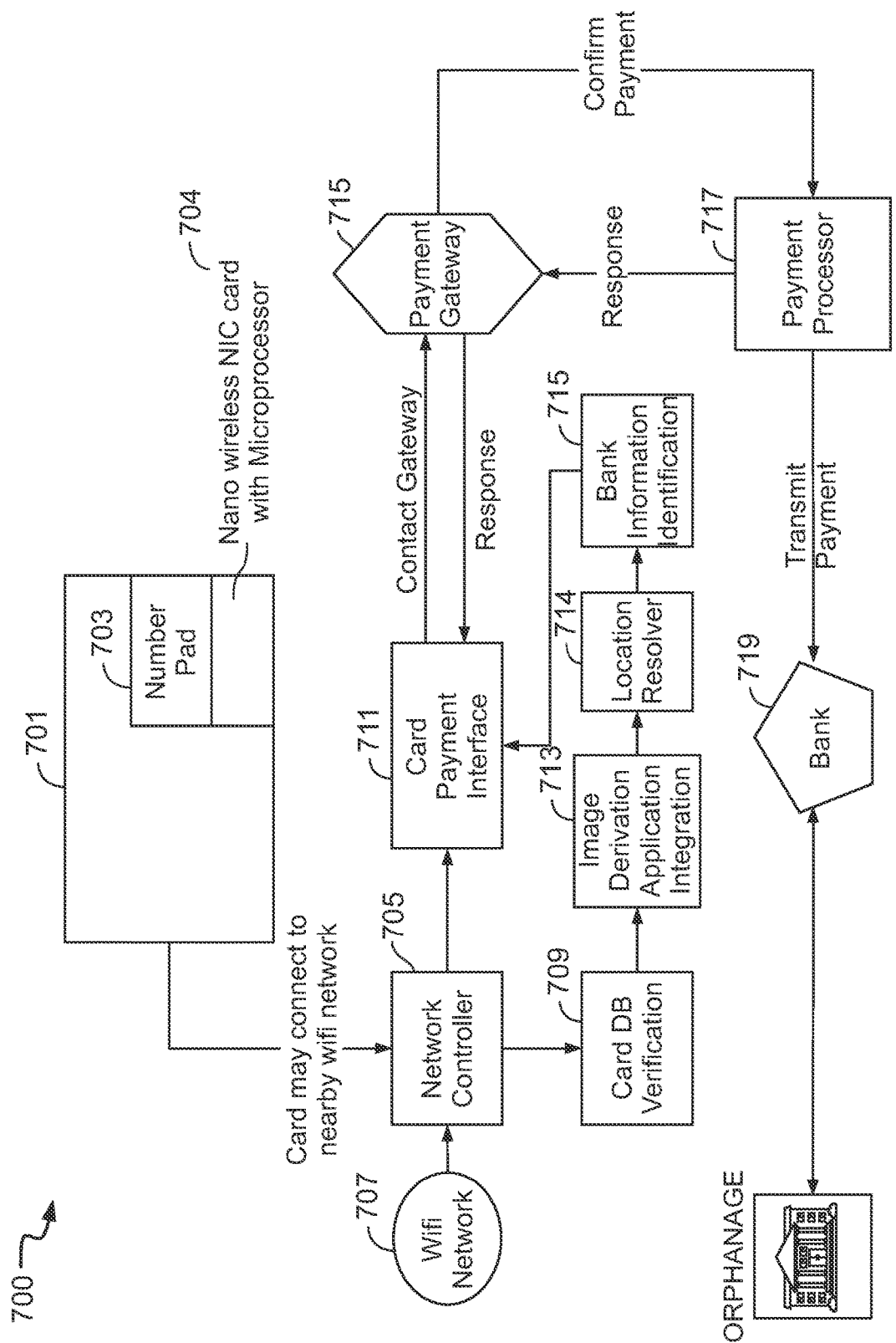
FIG. 7 shows an illustrative flow diagram according to the principles of the disclosure.

FIG. 7 shows illustrative system diagram 700 in accordance with principles of the disclosure. Diagram 700 includes smart card 701. Smart card 701 may include a camera, wireless connector, microprocessor, and tactile sensor/display 703. Card 701 may connect to a nearby WiFi network 707 via a wireless network controller 705. The connection to wireless network controller 705 may be coupled to the card 701 using a card-mounted nano wireless Network Interface Controller (NIC) with microprocessor 704.

An image of a building, or other relevant image, captured by the camera of card 701 may be processed via elements 709 and 713. Element 709 may include a card database verification system. Prior to making a payment from card 701 to, for example, an orphanage, card 701 should preferably be authorized to make such a payment. Authorization may be implemented via the card database verification system 709.

In addition, an image derivation application 713 should be invoked to derive entity information from the image retrieved by the camera. Preferably, image derivation application 713 is shown as being integrated into the process image capture and recognition.

Image derivation application 713 preferably feeds the information derived from the image, such as an entity associated with the derived image, to a location resolver 714.

Further processing may include parsing text fields and using image processing to determine a payment recipient and an amount owed. Location resolver 714 may, in some embodiments, confirm the entity and/or location information derived by image derivation application 713. Once location resolver 714 has confirmed the entity and/or location information, then location resolver 714 may preferably use the entity and/or location information to derive a payment (or other communication) pathway to an account associated with the entity and/or location.

Card payment interface 711 may pay the selected amount owed over payment gateway 715, which may include payment processor 717. The payment may be executed from an account of the user at bank 719 to an account associated with entity 721.

It should be noted that image derivation application 713 may include a set of vision-based computing capabilities that can better interpret an image and use that information to copy or translate text, identify buildings and/or addresses, explore locales, and/or take other useful actions.

Image derivation application 713 may also be used to provide entity and/or location information to location resolver 714. Using a photo from a camera or almost any image, image derivation application 713 can also, when necessary, help a user discover visually similar images and related content, gathering results from all over the internet.

Image derivation application 713 can compare objects in the captured or otherwise retrieved picture to other images, and can preferably rank those images based on their similarity and relevance to the objects in the original picture. Image derivation application 713 also uses its understanding of objects in the picture to find other relevant results from the web. Image derivation application 713 may also use other helpful signals, such as words, language, and other metadata on the image's host site, to determine ranking and relevance—and, preferably, to identify the entity and/or location. In some embodiments, image derivation application 713 can work together with a QR code physically deployed at the location and viewable on the captured image. The QR code can preferably aid in the determination of the location/entity information.

It should be noted that image derivation application 713 may preferably work in tandem with a global positioning engine (GPS) (not shown) in order to better identify the location being photographed. This may serve to provide a two-pronged identifier to more quickly and accurately determine the entity at the specified location.

Figure 8:
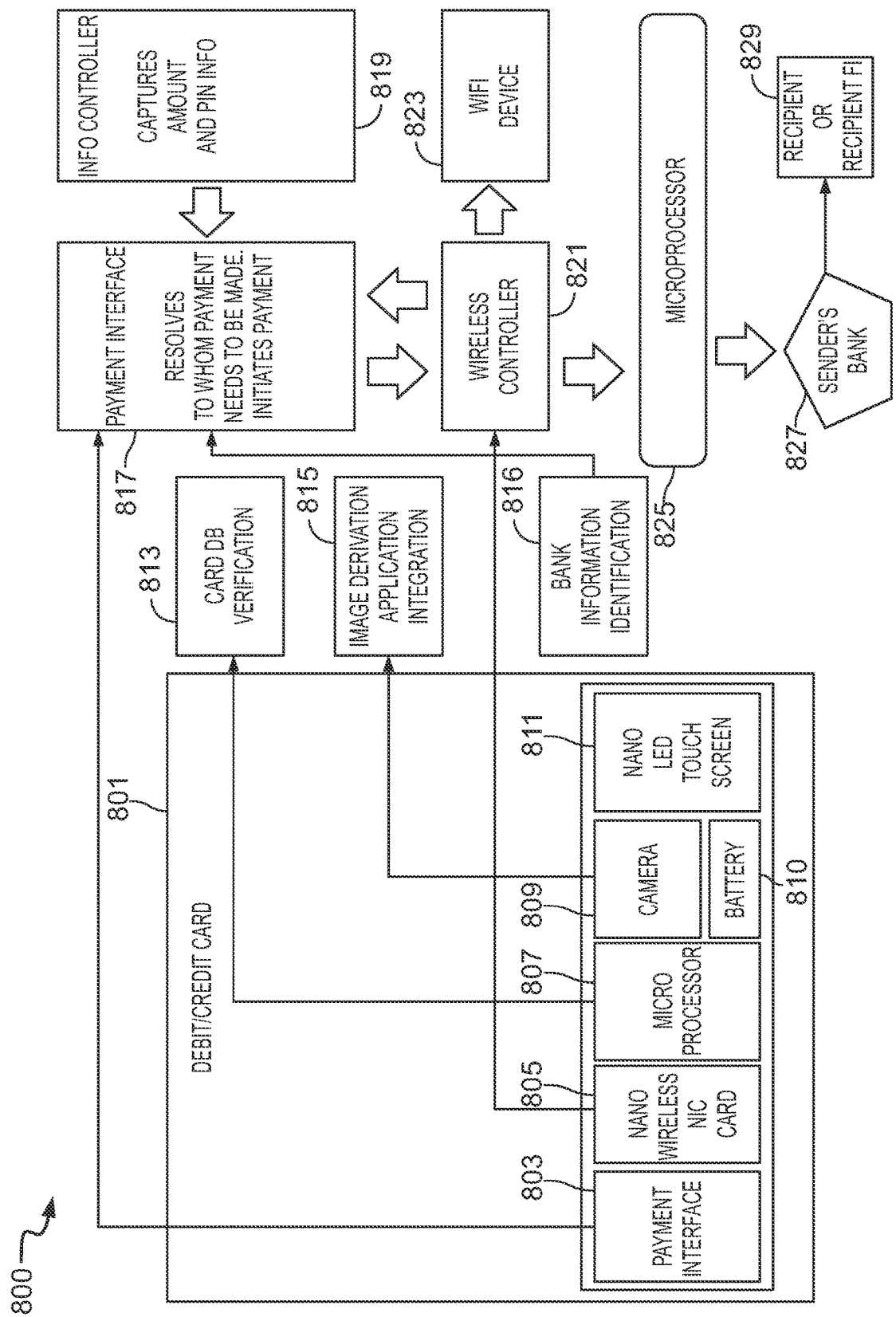
FIG. 8 shows an illustrative system diagram according to the principles of the disclosure.

FIG. 8 shows illustrative system diagram 800 in accordance with principles of the disclosure. Diagram 800 includes smart card 801. Card 801 includes payment interface 803, wireless connector 805, microprocessor 807, camera 809, touchscreen 811, and battery 810.

Card 801 may capture an image of a building via camera 809. The image may be processed via image derivation application 815 (which may be located either internally to the card or externally thereto). Image derivation application 815 may be linked to an appropriate database, GPS system and/or ML library to determine an entity associated with the location captured by the image.

Card 801 may determine a payment (or other communication) recipient and an amount intended to transfer. In one embodiment, recipient bank identification information may be resolved at 816 (a suitable bank identification information resolver may be located either internally to the card or externally thereto). Card 801 may also leverage microprocessor 807 to verify the authority of card 801, as shown at 813, which represents a card database verification (preferably located remotely from the card). This verification may occur using a central server or other suitable source.

Card 801 may execute the payment for the amount determined at via payment interface 817. The payment may be authorized by the user. Authorization may leverage information entered via touchscreen 811, and may involve information controller 819.

Card 801 may communicate via wireless controller 821, and may use WiFi device 823 to communicate to an outside network. Microprocessor 825 may coordinate the processing and communication of the system. Card 801 may execute payments, or other communications to recipient (or recipient's FI) 829 through bank 827. It should be noted that payment interface 817, information controller 819, wireless controller 821, WiFi device 823 and/or microprocessor 825 may preferably be located internally to card 800 (or externally thereto)—as indicated by the co-appearance of the similar items on card 800 and external to card 800.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer readable data structures.

Thus, methods and systems for a device with lens depiction profile technology engine are provided. Persons skilled in the art will appreciate that the present invention can be practiced by other than the described embodiments, which are presented for purposes of illustration rather than of limitation, and that the present invention is limited only by the claims that follow.

What is claimed is:

1. A platform for secure and efficient communication, and communication execution with a physical plant, said platform comprising a smart card that comprises:
   a microprocessor;
   a camera;
   a power source for the microprocessor and the camera;
   a wireless communication element configured to provide wireless communication between the smart card and a communications gateway; and
   a non-transitory memory storing computer-executable instructions, that, when run on the microprocessor, are configured to:
   capture, via the camera, an image of the physical plant, said image comprising image information indicative of the identity of the physical plant;
   process the image via an image information processing module;
   determine, based at least in part on the processing of the image information, a texting information recipient associated with the image; and
   execute a transaction, over the communication gateway, from an account associated with a user of the platform to an account associated with the entity information recipient;
   wherein, when the recipient is not internally detectable from the text fields, determining the recipient comprises leveraging information derived from the processing of the text fields, and said leveraging comprises searching the internet, via an artificial intelligence (AI) component of the platform, for a recipient associated with the information.

2. The platform of claim 1, wherein the information comprises a company logo.

3. The platform of claim 1, further comprising resolving, via an artificial intelligence (AI) component of the platform, a routing path for the recipient.

4. The platform of claim 1, further comprising a display screen and a tactile sensor, wherein the platform is further configured to:
   display communication information on the display screen, said communication information comprising the balance amount and/or the communication recipient; and
   execute the payment when authorization is received via the tactile sensor.

5. The platform of claim 4, further comprising a touchscreen that comprises the display screen and the tactile sensor.

6. The platform of claim 4, wherein the authorization comprises entry of a personal identification number (PIN).

7. The platform of claim 1, wherein the smart card comprises a housing made from metal and/or plastic, and the housing has dimensions that conform to the ISO/IEC 7810 ID-1 standard, said dimensions being no greater than 86 millimeters×54 millimeters×0.8 millimeters.

8. The platform of claim 1, wherein:
   the wireless communication element is a nano wireless network interface card ("NIC");

the power source is rechargeable via solar energy, inductive charging, and/or a charging port; and the microprocessor, the power source, the wireless communication element, and the memory are embedded in the smart card.

9. A method for secure and efficient information capture and analysis, said method comprising:
- capturing, via a camera embedded in a smart card, an image of a physical plant, said image comprising image identification information;
- processing, via a microprocessor embedded in the smart card and using a text processing module, the image;
- determining, based at least in part on the processing of the image, a payment recipient associated with the image or with an entity associated with the image;
- executing a payment from an account associated with a user of the smart card to an account associated with the payment recipient, said executing performed via a wireless communication element embedded in the smart card which is configured to provide wireless communication between the smart card and a payment gateway, and
- resolving, via an artificial intelligence (AI) component of the platform, a payment routing path for the payment recipient.

10. The method of claim 9, wherein, when the payment recipient is not internally detectable from the text fields, the determining the payment recipient comprises leveraging information derived from the processing of the text fields, and said leveraging comprises searching the internet, via an artificial intelligence (AI) component of the platform, for a payment recipient associated with the information.

11. The method of claim 10, wherein the information comprises a company logo.

12. The method of claim 9, further comprising: displaying payment information on a display screen embedded in the smart card, said payment information comprising a payment amount and/or the payment recipient; and executing the payment when authorization is received via a tactile sensor embedded in the smart card.

13. The method of claim 12, wherein the smart card comprises a touchscreen that comprises the display screen and the tactile sensor.

14. The method of claim 12, wherein the authorization comprises entry of a personal identification number (PIN).

15. The method of claim 9, wherein the smart card comprises a housing made from metal and/or plastic, and the housing has dimensions that conform to the ISO/IEC 7810 ID18 1 standard, said dimensions being no greater than 86 millimeters×54 millimeters×0.8 millimeters.

16. The method of claim 9, wherein:
- the wireless communication element is a nano wireless network interface card ("NIC"); and
- the smart card further comprises an embedded power source that is rechargeable via solar energy, inductive charging, and/or a charging port.

17. A smart card with secure and efficient image capture and analysis, said smart card comprising:
- a housing made from metal and/or plastic, and the housing has dimensions that conform to the ISO/IEC 7810 ID-1 standard, said dimensions being no greater than 86 millimeters×54 millimeters×0.8 millimeters;
- a microprocessor embedded in the housing;
- a camera embedded in the housing;
- a display screen embedded in the housing;
- a tactile sensor embedded in the housing;
- a power source embedded in the housing for the microprocessor, the camera, the display screen, and the tactile sensor, and the power source is rechargeable via solar energy, inductive charging, and/or a charging port;
- a wireless communication element embedded in the housing configured to provide wireless communication between the smart card and a payment gateway, and said wireless communication element is a nano wireless network interface card ("NIC"); and a non-transitory memory embedded in the housing storing computer-executable instructions, that, when run on the microprocessor, are configured to:
- capture, via the camera, an image of a building;
- process the image of the building via an image processing module;
- determine, based at least in part on the processing of the image, a payment amount and a payment recipient associated with the building, wherein, when the payment recipient is not internally detectable from the image, said determining the payment recipient comprises leveraging information derived from the processing of the text fields, and said leveraging comprises searching the internet, via an artificial intelligence (AI) component of the smart card, for a payment recipient associated with the information;
- display payment information on the display screen, said payment information comprising the payment amount and/or the payment recipient; and
- when authorization is received via the tactile sensor, execute a payment, over the payment gateway and for the balance amount, from an account associated with a user of the smart card to an account associated with the payment recipient;
- wherein, when the recipient is not internally detectable from the text fields, the recipient is determined by leveraging information derived from the processing of the text fields, and said leveraging comprises searching the internet, via an artificial intelligence (AI) component of the platform, for a recipient associated with the information.

18. The smart card of claim 17, further configured to resolve, via an artificial intelligence (AI) component of the smart card, a payment routing path for the payment recipient.

* * * * *